United States Patent
Gray et al.

(12) 
(10) Patent No.: US 6,479,766 B2
(45) Date of Patent: Nov. 12, 2002

(54) SEAT OCCUPANT WEIGHT DETECTION SYSTEM HAVING COMPENSATION FOR SEAT AGING AND USAGE

(75) Inventors: Charles A. Gray, Noblesville, IN (US); Royce L. Rennaker, Converse, IN (US); Phillip E Kaltenbacher, II, Kokomo, IN (US); Chance Lee Scales, Kokomo, IN (US); James Gerard Gallagher, Carmel, IN (US); Gregory Allen Cobb, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 113 days.

(21) Appl. No.: 09/816,024

(22) Filed: Mar. 26, 2001

(65) Prior Publication Data

US 2002/0134592 A1 Sep. 26, 2002

(51) Int. Cl.[7] .......................... G01G 23/01; G06F 7/00; B60R 22/00
(52) U.S. Cl. ........................ 177/144; 177/208; 701/45; 702/101; 73/1.13; 280/735
(58) Field of Search .............................. 701/45; 702/101, 702/102; 177/144, 208, 209, 254, 50; 73/1.13; 180/273; 280/735

(56) References Cited

U.S. PATENT DOCUMENTS

| | | | | |
|---|---|---|---|---|
| 4,529,050 A | * | 7/1985 | Mosher et al. | 177/50 |
| 5,832,417 A | * | 11/1998 | Petrucelli et al. | 702/101 |
| 5,987,370 A | | 11/1999 | Murphy et al. | 701/45 |
| 6,138,067 A | | 10/2000 | Cobb et al. | 701/45 |
| 6,438,476 B1 | * | 8/2002 | Gray et al. | 701/45 |
| 6,438,477 B1 | * | 8/2002 | Patterson et al. | 701/45 |

* cited by examiner

*Primary Examiner*—Randy W. Gibson
(74) *Attorney, Agent, or Firm*—Robert M. Sigler

(57) ABSTRACT

An improved occupant weight detection system measures the pressure in a fluid-filled bladder disposed in or under a foam seat cushion as an indication of occupant weight, and periodically adjusts the pressure vs. occupant weight relationship to compensate for changes due to aging and usage of the foam seat cushion. The system controller develops an aging adjustment value based on a measure of the cumulative aging and usage of the seat, and uses the developed adjustment value to compensate the operation of the system. The aging adjustment value is determined primarily as a function of occupant weight and time of seat occupancy, and the compensation is achieved by using the aging adjustment value to adjust either the estimated weight, or a threshold to which the measured pressure is compared for purposes of deciding if restraint deployment should be enabled.

6 Claims, 4 Drawing Sheets

SEAT OCCUPANT WEIGHT DETECTION SYSTEM HAVING COMPENSATION FOR SEAT AGING AND USAGE

TECHNICAL FIELD

The present invention relates to an occupant weight detection system based on the fluid pressure in a bladder placed in or under a foam seat cushion, and more particularly to compensation of the detected weight for aging and usage of the foam seat cushion.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criterion to distinguish between an adult and an infant or small child. A known and particularly effective way of estimating occupant weight is by measuring the pressure in a fluid-filled bladder disposed in or under the foam seat cushion. See, for example, the U.S. Pat. No. 5,987,370 to Murphy et al. and U.S. Pat. No. 6,138,067 to Cobb et al., both of which are assigned to the assignee of the present invention, and incorporated herein by reference. In general, the measured pressure in such systems increases substantially monotonically from a "vacant seat" pressure as occupant weight is applied to the seat cushion. Significantly, the aforementioned U.S. Pat. No. 6,138,067 to Cobb et al. describes how the vacant seat pressure tends to shift with age and usage of the seat, and discloses a system for adaptively adjusting a calibrated value of the vacant seat pressure if the measured pressure falls below the calibrated value for at least a predetermined period of time.

Further development has additionally revealed that age and usage of the seat tends to shift the pressure vs. weight relationship of an occupied seat. Thus, even if the vacant seat pressure is properly calibrated, the estimated occupant weight will vary depending on the age and usage of the seat. Unfortunately, the adaptive technique used to adjust the vacant seat pressure in the aforementioned U.S. Pat. No. 6,138,067 to Cobb et al. cannot be used to compensate for changes in the pressure vs. weight relationship of an occupied seat, since the weight used to calibrate the pressure vs. weight relationship only occurs in a factory setting. Accordingly, what is needed is a pressure-based occupant weight detection system that continues to accurately detect occupant weight in spite of aging and usage of the seat.

SUMMARY OF THE INVENTION

The present invention is directed to an improved occupant weight estimation system in which the pressure in a fluid-filled bladder disposed in or under a foam seat cushion is measured as an indication of occupant weight, and wherein the pressure vs. occupant weight relationship is periodically adjusted over time to statistically compensate for changes due to aging and usage of the foam seat cushion. According to the invention, the system controller develops an aging adjustment value based on a measure of the cumulative aging and usage of the seat, and uses the developed adjustment value to compensate the operation of the system. The aging adjustment value is determined primarily as a function of occupant weight and time of seat occupancy, and the compensation is achieved by using the aging adjustment value to adjust either the estimated weight, or a threshold to which the measured pressure is compared for purposes of deciding if restraint deployment should be enabled. In the illustrated embodiment, the aging adjustment value is limited by a learned reduction of the vacant seat pressure.

DESCRIPTION OF THE PREFERRED EMBODIMENT

Figure 1:
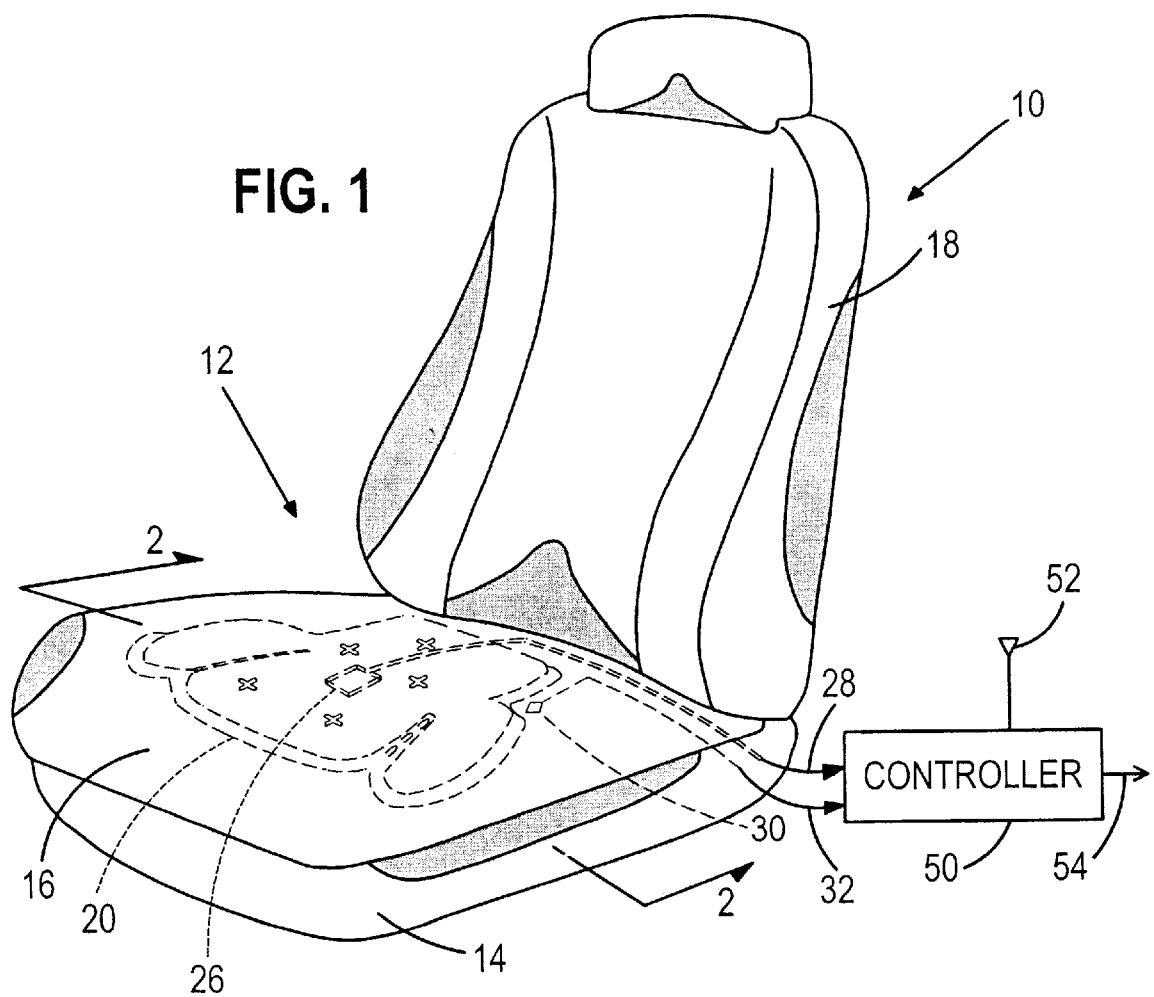
FIG. 1 is a system diagram illustrating a passenger seat of a vehicle equipped with a fluid-filled bladder and a controller for detecting the weight of a seat occupant in accordance with this invention.

The present invention is disclosed in the context of an occupant weight estimation system as generally designated by the reference numeral 10 in FIG. 1. The vehicle seat, generally designated by the reference numeral 12, is supported on a frame 14, and includes foam cushions 16 and 18 on the seat bottom and back. A vacuum formed polymeric bladder 20 disposed in or under the foam cushion 16 substantially parallel with the central seating surface preferably contains a fluid such as silicone which is non-corrosive, and not subject to freezing at extreme ambient temperatures.

Figure 2:
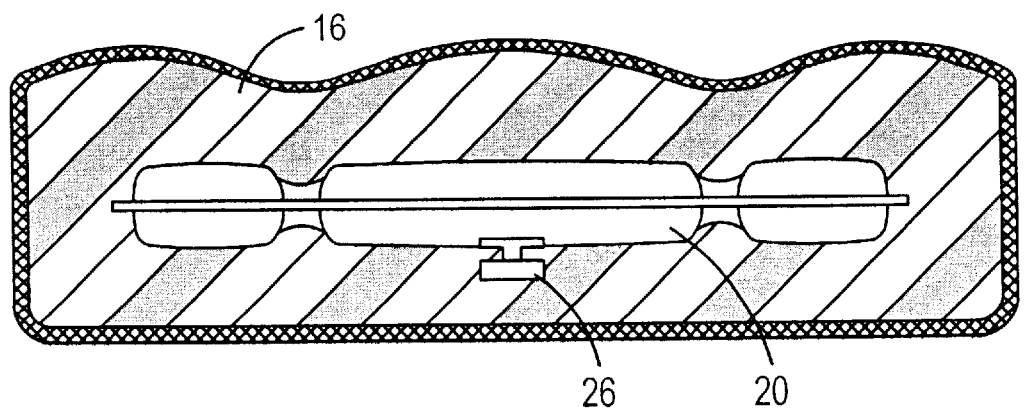
FIG. 2 is a cross-section view of the foam seat cushion and fluid-filled bladder of FIG. 1.

Referring to FIGS. 1 and 2, the interior of bladder 20 is coupled to the inlet of a pressure sensor 26, which provides an electrical output signal on line 28 indicative of the fluid pressure in the bladder 20. A temperature sensor 30 located in proximity to the bladder 20 provides an electrical output signal on line 32 indicative of the bladder and foam temperature. The sensor 30 can be provided as a separate sensor as indicated in FIG. 1, or may be integrated with the pressure sensor 26.

The electrical pressure and temperature signals on lines 28 and 32 are provided as inputs to a controller 50, which determines if the seat 12 is occupied and estimates the weight of the occupant based on the pressure and temperature signals, possibly in combination with other inputs, such as an atmospheric pressure signal provided pressure sensor 52. An electrical output signal indicative of the weight estimation is provided on line 54, and may be used, for example, as a factor in determining whether and how forcefully to deploy air bags or other pyrotechnically deployed restraints in a crash event.

Figure 3:
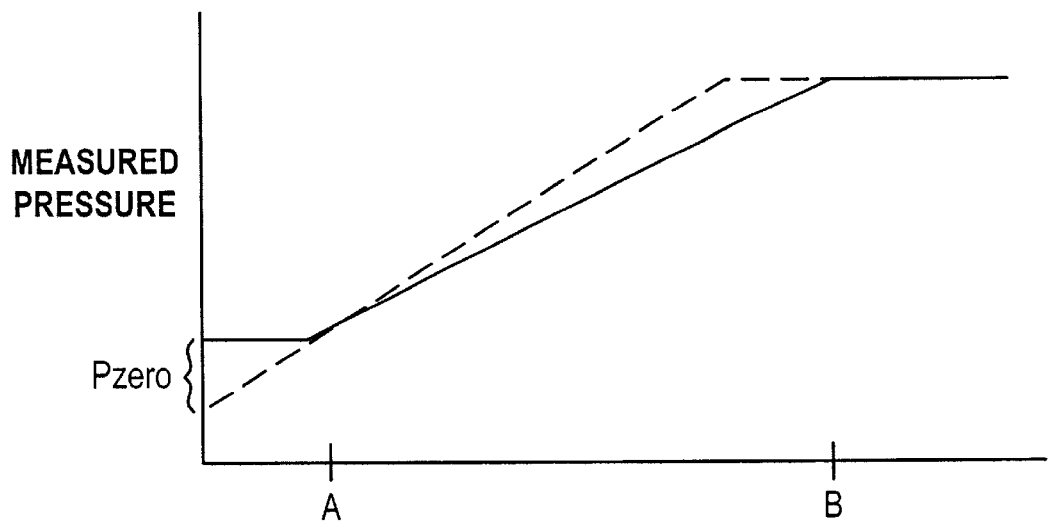
FIG. 3 is a graph depicting a nominal pressure vs. weight relationship for the system of FIG. 1.

In general, the fluid has a nominal or unloaded pressure referred to as the vacant seat pressure (Pzero), and the fluid pressure increases monotonically with occupant weight applied to the cushion 16, as graphically depicted in FIG. 3. The solid trace represents the pressure vs. weight relationship for a new seat, whereas the broken trace represents the pressure vs. weight relationship for an old and/or highly used seat. In a new seat, the relationship tends to be nonlinear below a certain weight designated as weight A, generally linear between weights A and B, and substantially constant for weights above weight B due to saturation effects. Aging and wear of the seat has two effects: (1) reducing the vacant seat pressure, making the pressure vs. weight relationship more linear below weight A, and (2) increasing the gain of the pressure vs. weight relationship between weight A and the saturation point. Whereas the aforementioned U.S. Pat. No. 6,138,067 to Cobb et al. compensates for gradual decreasing of the vacant seat pressure, the present invention compensates for the gradual increasing of the pressure vs. weight gain.

According to the present invention, controller 50 develops an aging adjustment value (AAV) based primarily on the amount of time the seat is occupied and the detected occupant weight, and uses the developed adjustment value to compensate the operation of the system. The compensation is achieved by adjusting either the detected weight, or a threshold to which the measured pressure is compared for purposes of deciding if restraint deployment should be enabled. Also, the aging adjustment value AAV can be limited by a learned reduction of the vacant seat pressure to ensure that the adjustment of the pressure vs. weight relationship is consistent with the adjustment of the vacant seat pressure, since aging and wear are primarily responsible for both phenomena. In the illustrated embodiment, AAV is determined as a function of time, estimated occupant weight and seat temperature by implementing the following function:

$$AAV=\Sigma[(WT\_ADJ*GAIN\_FACTOR)+TEMP\_ADJ]$$

where WT_ADJ is an adjustment component that generally increases with increasing occupant weight WT_EST, GAIN_FACTOR is a calibrated gain term, and TEMP_ADJ is an adjustment component that generally increases with increasing seat temperature SEAT_TEMP. The time dependency is determined by the update rate of WT_ADJ and TEMP_ADJ. Alternatively, AAV can be determined by the function:

$$AAV=\Sigma(TEMP\_GAIN*WT\_ADJ*GAIN\_FACTOR)$$

where TEMP_GAIN is a gain factor that increases with increasing seat temperature SEAT_TEMP. The term GAIN_FACTOR is used as a weighting term, and is determined based on vehicle usage statistics so that AAV reaches a value that fully compensates the occupant weight estimate for seat aging when the vehicle has reached a certain age (such as eight years) or has been driven a certain distance (such as 150,000 miles or 240,000 km).

Figure 4:
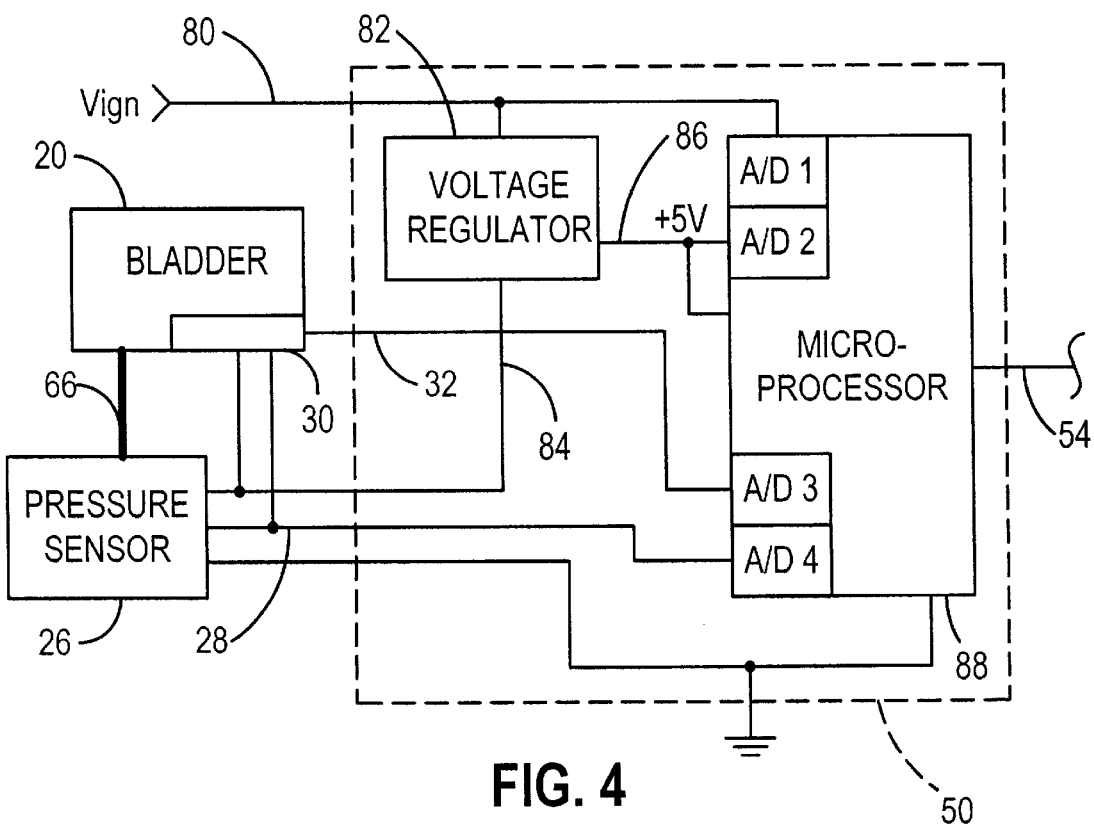
FIG. 4 is a block diagram of the controller of FIG. 1, in the context of an air bag deployment system, including a programmed microprocessor.

FIG. 4 depicts the occupant weight detection system of the present invention in the context of an air bag deployment system in which the controller 50 provides an output signal on line 54 indicating whether deployment should be inhibited or allowed based on sensed occupant weight. Vehicle ignition voltage Vign, which may be +12 VDC, is supplied to controller 50 via line 80, and an internal voltage regulator 82 provides a regulated system voltage of +5 VDC on lines 84 and 86. The system and ground voltages are supplied to source voltage terminals of the pressure sensor 26, the temperature sensor 30 (which may be a thermistor), and a microprocessor 88. The microprocessor 88 has four analog-to-digital input channels A/D 1–A/D 4 that receive the ignition voltage Vign, the system voltage of voltage regulator 82, the temperature sensor output voltage on line 32, and the pressure sensor output voltage on line 28.

Based on the above-described inputs and factory calibration values, the microprocessor 88 estimates the occupant weight, and based on predetermined criteria, whether air bag deployment should be inhibited or allowed. In the illustrated control strategy, air bag deployment is to be inhibited for occupants below a predetermined weight, referred to herein as the threshold weight.

Figure 5:
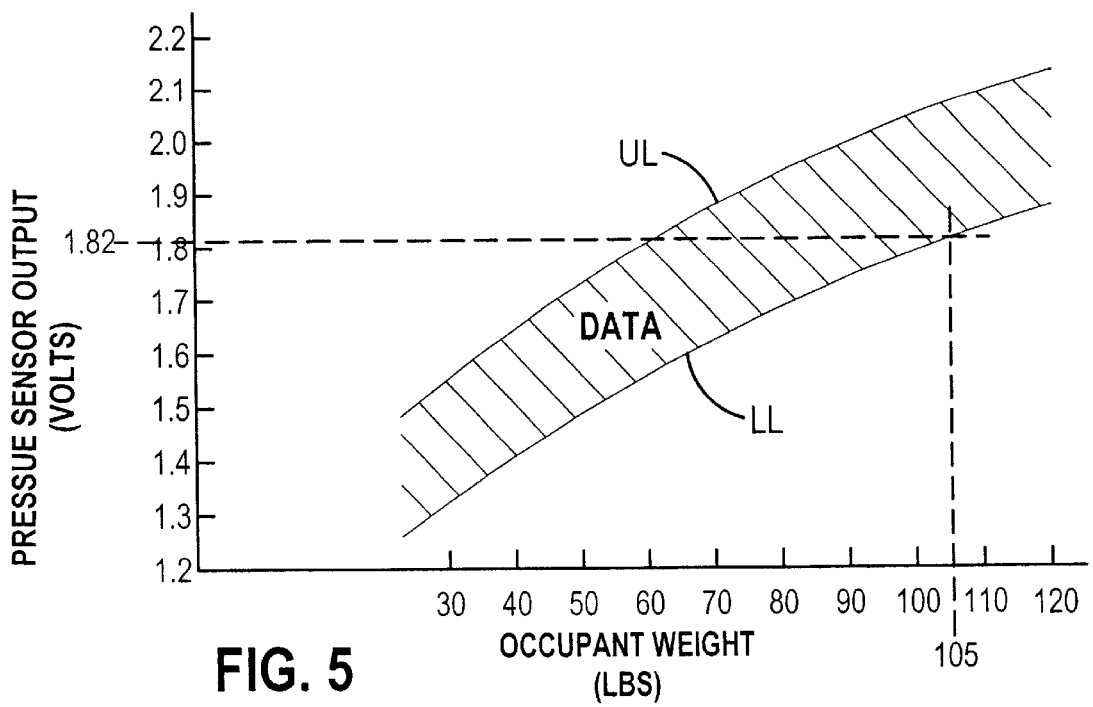
FIG. 5 is a graph depicting pressure sensor output voltage as a function of occupant weight, as used in the system of FIG. 4.

In general, the calibration effort involves empirically determining the gain of the pressure vs. weight relationship at a variety of seat temperatures. In a system as suggested in FIG. 1, the empirical data can be used to construct either a mathematical model or a multi-dimensional look-up table of occupant weight as a function of temperature and sensed pressure, with the model or table programmed into the controller 50 and used to determine and output the occupant weight on line 54. In the system of FIG. 4, however, the output merely indicates whether the occupant is above or below the threshold weight, within the system tolerance constraints. In this case, the empirically determined data may be plotted as shown in FIG. 5, and used to develop a pressure sensor threshold voltage for determining whether deployment should be inhibited or allowed. For the data represented in FIG. 5, for example, the lines designated as upper limit UL and lower limit LL bound the pressure sensor output voltage variability for any given occupant weight. Given a threshold occupant weight, such as 105 lbs., for example, the lower limit LL defines a threshold voltage (about 1.82 volts) that is the minimum voltage one would expect to see for an occupant of such weight.

Figure 6:
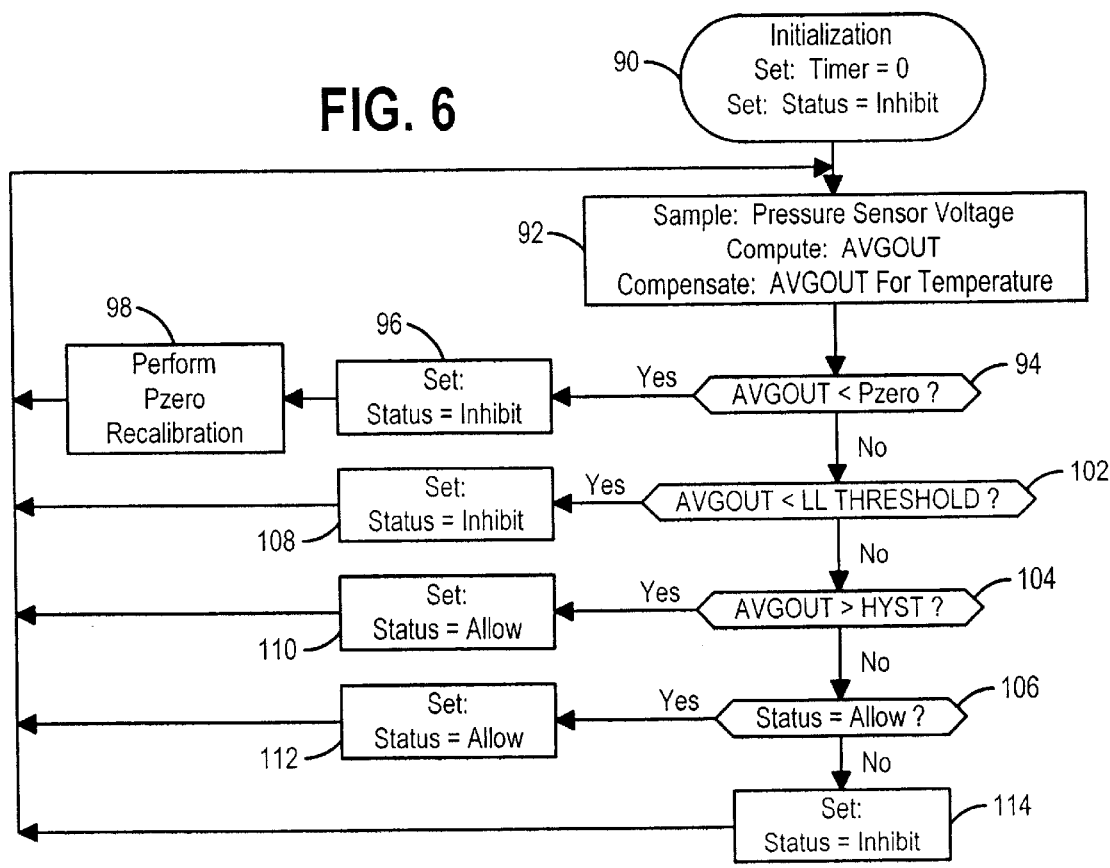
FIGS. 6–7 are flow charts representative of computer program instructions executed by the microprocessor of FIG. 4 in carrying out the control of this invention.
Figure 7:
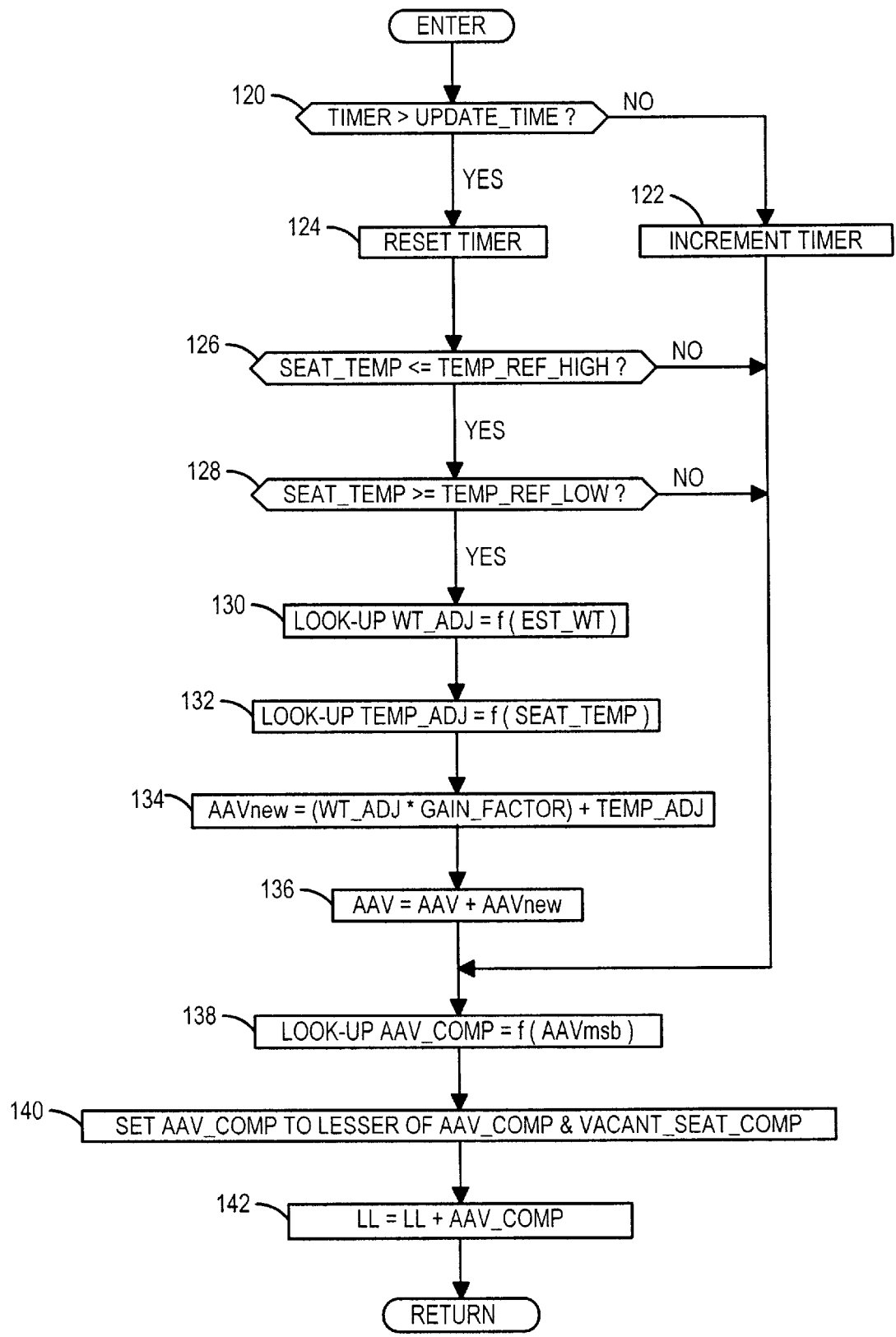

A simple control algorithm based on the above described threshold voltage is depicted in the flow diagrams of FIGS. 6–7. The flow diagram of FIG. 6 represents a main or executive program, whereas the flow diagram of FIG. 7 represents a routine for adjusting the threshold LL based on AAV.

Referring to the main flow diagram of FIG. 6, the block 90 designates a series of program instructions executed at the initiation of vehicle operation for initializing the various registers and variable values, and for setting the system output variable STATUS to a state which inhibits deployment. Thereafter, the block 92 is executed to repeatedly sample the pressure sensor output voltage for a predefined interval to obtain an average output voltage AVGOUT, and to compensate AVGOUT for the temperature sensed by temperature sensor 30. If the temperature compensated value of AVGOUT is less than the current vacant seat pressure Pzero, as determined at block 94. the blocks 96 and 98 are executed to set STATUS to a state which inhibits deployment, and to carry out a Pzero re-calibration routine as described in the aforementioned U.S. Pat. No. 6,138,067 to Cobb et al. If AVGOUT is at least as large as Pzero, the blocks 102–106 are executed to determine whether deployment should be inhibited or allowed based on the value of AVGOUT relative to the LL Threshold and a hysteresis threshold HYST. If AVGOUT is below the LL Threshold, the block 108 sets the output variable STATUS to Inhibit, inhibiting deployment of the restraints. If AVGOUT is above HYST, the block 110 sets STATUS to Allow, allowing deployment of the restraints if the normal deployment criteria are met. If AVGOUT is between the LL and HYST, the blocks 112 or 114 maintain STATUS at its previous value. As indicated above, the LL Threshold may have a nominal value of approximately 1.82 volts, corresponding to an occupant weight of 105 lbs. The associated hysteresis threshold HYST may have a nominal value of 1.86, corresponding to an occupant weight of, say 107 lbs.

The flow diagram of FIG. 7, as mentioned above, represents a periodically executed routine for adjusting LL based on the aging adjustment value AAV. For example, the routine may be executed once every 100 msec. However, the value of AAV is typically updated at a much slower rate, such as once every several minutes. Accordingly, the block 120 is first executed to determine if a software TIMER is greater than a constant designated in FIG. 7 as UPDATE_TIME. If not, block 122 is executed to increment TIMER, and the blocks 138–142 are executed to adjust LL based on the current value of an AAV-based compensation term, AAV_COMP, as explained below. When TIMER reaches UPDATE_TIME and block 120 is answered in the affirmative, block 124 resets TIMER, and the blocks 126 and 128 are executed to determine if SEAT_TEMP is in a mid-range of temperatures defined by the bounds TEMP_REF_HIGH and TEMP_REF_LOW. If so, the blocks 130, 132, 134 and 136 are executed to update AAV_COMP. First, the blocks 130 and 132 determine the weight and temperature adjustment components WT_ADJ, TEMP_ADJ by table look-up, based on the estimated EST_WT (or AVGOUT) and SEAT_TEMP, respectively. The block 134 then computes an aging adjustment value update AAVnew based on WT_ADJ, GAIN_FACTOR and TEMP_ADJ, which is summed with the current value of AAV at block 136. In the illustrated embodiment, AAV is a multiple-byte term, and the compensation value AAV_COMP is determined at block 138 based only on the most significant byte (msb) of AAV. Then block 140 sets AAV_COMP equal to the lesser of AAV_COMP and the amount VACANT_SEAT_COMP by which the vacant seat pressure Pzero has been adjusted for aging and wear, per the aforementioned U.S. Pat. No. 6,138,067 to Cobb et al. Finally, the block 142 increases LL by the compensation value AAV_COMP, completing the routine.

In summary, an occupant weight estimation system according to this invention is automatically compensated for variations in the pressure vs. weight gain of a fluid-filled seat bladder that occur due to aging and wear. The look-up table values are calibrated to correspond to a given seat life expectancy, based on gain changes observed during extended testing under varying conditions, and may vary somewhat based on depending on the seat design and materials. While illustrated in reference to the illustrated embodiment, it is expected that various modification in addition to those mentioned above will occur to those skilled in the art. Thus, it will be understood that systems incorporating these and other modifications may fall within the scope of this invention, which is defined by the appended claims.

What is claimed is:

1. A system for detecting the weight of an occupant of a seat in a motor vehicle, the seat having a foam cushion bottom, the apparatus comprising:

a pressure sensing mechanism disposed in or under the foam cushion bottom for providing a pressure signal output in response to the occupant weight;

a temperature sensor for sensing a temperature in proximity to said foam cushion bottom, and providing a temperature signal output; and a controller for estimating the occupant weight based on the pressure signal output, the temperature signal output, and a calibrated value corresponding to a pressure signal output associated with a predetermined occupant weight, the controller including means for determining an indication of aging and wear of the foam cushion bottom, and for adjusting the calibrated value upward based on such indication, to thereby compensate the occupant weight estimate for aging and wear of said foam cushion bottom.

2. The system of claim 1, wherein the controller determines the indication of aging and wear by periodically sampling the occupant weight estimate during operation of said vehicle, and accumulating such samples, such that the compensation of the occupant weight estimate increases with increasing magnitude and duration of said occupant weight estimate.

3. The system of claim 2, wherein the indication of aging and wear is additionally based on said temperature signal output during operation of said vehicle so that the compensation of the occupant weight estimate increases with increasing temperature of said seat foam bottom during operation of said vehicle.

4. The system of claim 2, wherein the accumulated occupant weight estimate is adjusted by a predetermined gain factor that is calibrated based on vehicle usage statistics so that said occupant weight estimate is fully compensated when the vehicle reaches a given age or has been driven a given distance.

5. The system of claim 1, wherein the controller periodically adjusts downwardly a calibrated vacant seat pressure corresponding to a pressure signal output when the seat is vacant, and limits the compensation of said occupant weight estimate to based on a cumulative downward adjustment of said calibrated vacant seat pressure.

6. The system of claim 1, wherein said calibrated value corresponds to a predetermined occupant weight, and the controller compares an average value of said pressure signal output to said calibrated value to determine the occupant weight relative to said predetermined occupant weight.

* * * * *